(No Model.)
J. B. DANIEL.
Tea and Coffee Pot.
No. 237,077. Patented Jan. 25, 1881.
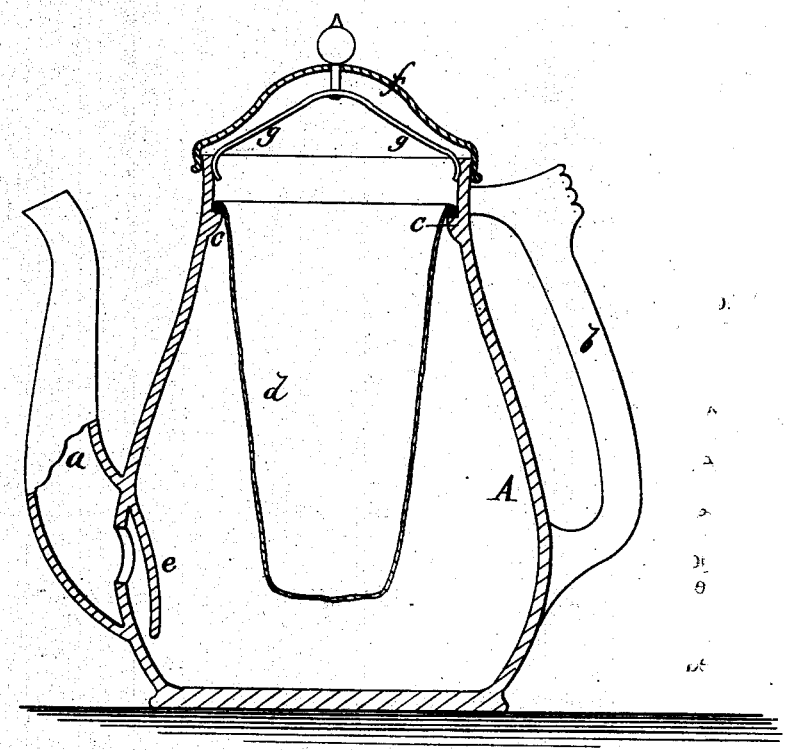
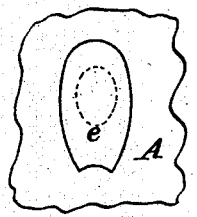
WITNESSES:
Henry N. Miller
C. Sedgwick
INVENTOR:
J. B. Daniel
BY
ATTORNEYS.

UNITED STATES PATENT OFFICE.

JOHNSON B. DANIEL, OF TRENTON, NEW JERSEY.

TEA AND COFFEE POT.

SPECIFICATION forming part of Letters Patent No. 237,077, dated January 25, 1881.

Application filed May 27, 1880. (No model.)

*To all whom it may concern:*

Be it known that I, JOHNSON B. DANIEL, of Trenton, in the county of Mercer and State of New Jersey, have invented a new and Improved Tea and Coffee Pot, of which the following is a specification.

The object of my invention is to furnish a tea or coffee pot for table use from which the aroma may not escape, and which shall permit the convenient use of a strainer for holding the tea-leaves and coffee-grounds.

My invention consists, first, in a lid of metal constructed to fit closely upon the top of an earthenware pot, and provided with a bent spring-plate for holding the cover in place.

In the accompanying drawings, forming part of this specification, Figure 1 is a vertical section of a coffee-pot embodying my improvements. Fig. 2 is an inside view of the portion around the spout.

Similar letters of reference indicate corresponding parts.

The pot A, with spout $a$ and handle $b$, is formed of earthenware and in a usual form. It is also formed with the ledge $c$ around its inner side a short distance from the edge of the opening, which ledge is preferably continuous, and serves to sustain the ring from which the bag or strainer $d$ is suspended, so that said strainer may be readily put in place or removed. The spout $a$ opens into the pot near the bottom, as usual, but with a single large opening instead of a number of small openings, and at the inner side of the pot there is formed a cap or flange, $e$, the bottom of which extends below the opening, and which is attached to the pot on all its sides except the lower, where there is an opening to permit escape of liquid to the spout. It will be seen that this cap $e$ forms a trap over the spout-opening, and will prevent escape of vapor until the liquid falls below its lower edge, while not preventing the liquid from being poured, as desired. With this cap the spout may be connected at the desired height from the bottom of the pot, and the tea or coffee may be drawn with a small quantity of water without losing the aroma through the spout.

The lid $f$ of the pot is of metal, spun with a flange that fits snugly around the top to prevent escape of vapor. Heretofore the lids have been made of earthenware held in place by lugs or similar devices; but such lids are liable to fall off and be broken, and do not fit tightly.

By forming the cover of metal it may be fitted tightly and is durable. To hold such cover securely I attach to the under side a spring plate or strip, $g$, which has its outer ends bent in curved form to bear upon the inner side of the opening with spring-pressure. To give the spring a better hold the inner edge of the opening may be made slightly concave, as shown. This spring serves to hold the lid securely, and the lid may be put in place by a slight pressure and removed by a pull upon it.

By this construction I furnish an earthenware pot adapted for table use, and most convenient and durable for use. The tea or coffee is to be placed in the bag $d$, the bag put in place, and the water then poured in. The bag prevents escape of the leaves or grounds to the spout, and the grounds or leaves will be removed by taking out the bag.

The ledge $c$ and cap $e$ may be applied to metal pots as well as those made of earthenware.

Having thus fully described my invention, I claim as new and desire to secure by Letters Patent—

The combination, with body A, of the cover $f$, fitting around the outer edge, and the bent plate $g$, adapted to spring within the inner edge, the cover and plate being connected at top, as shown and described.

JOHNSON BARTON DANIEL.

Witnesses:
  AUG. M. CROOK,
  E. W. HIEDS.